United States Patent Office 3,443,386
Patented May 13, 1969

3,443,386
SAND CONSOLIDATION
Albert W. Coulter, Jr., Claude T. Copeland, and Clare H. Kucera, Tulsa, Okla., assignors to The Dow Chemical Company, Midland, Mich., a corporation of Delaware
No Drawing. Filed Nov. 20, 1967, Ser. No. 684,486
Int. Cl. E02d 3/12
U.S. Cl. 61—36                     7 Claims

ABSTRACT OF THE DISCLOSURE

Loose or incompetent sands and sandy soils are consolidated with hardenable phenol-aldehyde resins modified with a novel coupling agent. The latter is provided in the form of a tertiaryaminoalkyl phenol or a derivative thereof. Preferably, the derivative is the amine salt or quaternary. Such amino phenols significantly enhance the stength of sand or soil masses treated with the resins. The preferred salt and quaternary forms of the amino phenols can be incorporated directly into phenol-aldehyde partial condensation products to provide storage stable consolidating resins with a built-in coupling function.

---

The instant invention concerns a method for consolidating loose or incompetent sands with phenol-aldehyde type condensation resins. In particular, the method involves the use of a novel coupling agent.

The objects of sand consolidation are well known to the petroleum industry. Usually it is the purpose of sand consolidation to cohere loose sands adjacent a well borehole. When fluids are to be produced through the consolidated sands, an overflush is employed subsequent to treatment with the resin system to assure permeability of the treated sand mass. Additional permeability is achieved if the solvent dispersing medium for the resin is incompatable with the set resin.

Sometimes, it may be desirable to consolidate loose sand and simultaneously plug a formation to prevent the passage of undesired fluids. In such event, the use of an overflush, or such resin solvents as introduce porosity upon setting of the resin, is omitted from the treatment.

Sand consolidation treatment is not limited to the treatment of well boreholes. Examples of other applications for treatments to cohere loose or incompetent soils include the preparation of road and aircraft landing strip beds in sandy or otherwise incompetent soils. Also sandy soils, which have been excavated to contain liquids, e.g. petroleum and water, may be consolidated to reduce permeability and increase strength.

It is well known that consolidation treatments with hardenable phenol-aldehyde resin systems can be improved with the use of a coupling agent, the function of which is to promote the adherence of resin to soil particles. It is also known that certain amino functional organo silanes and a few specific organic amines will function as coupling agents. See for instance the teachings of U.S. Patents 3,282,338, 3,285,339 and 3,297,086.

It would be particularly desirable, however, and it is an object of the present invention, to employ novel coupling agents to promote strength properties of soils consolidated with phenol-formaldehyde resins. Especially desirable are coupling agents which offer flexibility in manipulative techniques. A further object and benefit is to provide relatively stable premixes of phenolic resins and coupling agents.

The foregoing objects, and other benefits as will become apparent hereinafter, are achieved by consolidating incompetent soils such as sands and sandy soils with hardenable phenolic resins containing tertiaryamino phenols, salts, or quaternary derivatives. More particularly, the coupling agents of the invention are of a class of tertiary-aminoalkyl derivatives of hydroxyaryl compounds, preferably employed as amino salts or quaternaries. To obtain significant benefits, the amino phenols should be employed in an amount at least about 0.1 weight percent, based on resin solids modified. Good results are obtained by using from about 0.2 up to about 12 percent by weight of the additive.

In a preferred embodiment, the coupling agent is employed as an amine salt of hydrochloric acid.

In general, the useful amino phenols and their salts or quaternaries are well known. A large number of suitable compounds are taught in U.S. Patents 2,045,517. Briefly, their mode of preparation involves condensing a phenol, which is used herein in the sense of meaning a hydroxyaryl compound, with formaldehyde and a basic, secondary water-soluble amine. The phenol may be monocyclic or polycyclic but in general will not contain more than about 12 carbons. To obtain the desired amine derivatives it must be have an active hydrogen on at least one nuclear ring carbon atom ortho or para to a hydroxyl group. The preparation of a number of such amino derivatives of phenols is described on page 2, lines 16–46 of the above mentioned U.S. patent.

The preferred salt forms of the amino phenols are readily prepared by reaction with an organic or inorganic acid. Illustrative of the useful acids are phosphoric, sulfuric, hydrochloric, acetic and formic acids. In some instances, the acid may form a precipitate which is not soluble in the particular resin system to be modified. In such event another acid salt form should be used to assure good results.

When desired, quaternaries may be obtained from the amino phenols by reacting them with the nucleophlic, halogen-containing compuonds such as benzyl chloride, methyl chloride, methyl bromide and ethyl chloride. Quaternized forms of the amines may also be obtained by reaction with dimethyl sulfate.

The phenol-aldehyde resin systems useful in the practice of the invention are well known to the art of sand consolidation. They include generally the reaction products of low molecular weight hydroxyaryl compounds and aldehydes. Although these resin-forming ingredients can be incorporated into the soil and thermoset in situ, the preferred practice is to prepare a soluble, partially condensed system. By soluble is meant soluble in water or common organo solvents of which the following are illustrative: lightweight hydrocarbons, e.g., kerosene, naphtha, toluene, benzene, pentane, hexane, octane, light diesel oil and heating oils and mixtures thereof, or $C_1$ to $C_4$ aliphatic alcohols, e.g., methyl, ethyl, isopropyl alcohol, and mixtures thereof. Such intermediate condensation reactions may be catalyzed by alkaline or acidic catalysts. In a preferred embodiment, two soluble intermediate products, one phenol rich and the other aldehyde rich are prepared. These products are then mixed at the time of application to prepare the desired thermosettable resin system. Such patents as U.S. 2,541,688; U.S. 2,573,690; U.S. 2,823,753 and U.S. 2,986,538 all contain teachings as to phenol-formaldehyde resin systems well adapted for loose soil consolidation operations.

In practice of the invention, the amino phenol, as described above, may be incorporated into the resin prior to introducing the resin into the soil or sand to be rendered competent. Alternately it may be introduced into the sand or soil as a preflush or afterflush to obtain the strength improvements sought. When it is incorporated directly into the resin, workability and storage stability of the mixture are improved by using the amino phenol in the form of an amine salt or as a quaternary. Procedural details as to the emplacement of the resin and, if desired, restoration of permeability to the treated formation are well known to the art. Reference may be taken in this regard to U.S. 2,476,015, U.S. 3,022,825 and U.S. 3,285,399, especially in the latter, consider the disclosure beginning at column 9, lines 50, through column 11, line 37, which is incorporated herein by reference.

The following examples will illustrate more clearly the formulations contemplated within the scope of the instant invention. The evaluative data will show the excellent strength improvements achieved through the use of small amounts of the described coupling agents.

The additive amino phenol coupling agents were an isomeric mixture of ortho and para dimethylaminomethyl phenols herein designated (DMP), 2,4,6-(tridimethyl-aminomethyl) phenol herein designated (TMP), and dibutylaminomethyl phenol herein designated (DBP). Salts of these amines were obtained by neutralizing the free base form of the amine with a given acid. Quaternaries were obtained by reacting the amines with dimethyl sulfate. This was accomplished by adding the dimethyl sulfate slowly to a benzene dispersion of the amino phenol derivative. Care was taken to maintain the temperature below about 100° F. As the reaction proceeded, the quaternized amine separated as a distinct liquid phase. The desired quaternary was recovered by simple decantation. To facilitate their handling and dissolution in the resin system, the quaternary amine products were dissolved in ethyl alcohol.

The phenol-aldehyde resin system employed is formulated by mixing two different partial condensation products obtained according to the following recipes: Resin A is prepared by partially condensing 780 pounds of phenol, 1012 pounds of aqueous (37% by weight) formaldehyde, and 100 pounds of 50 percent aqueous caustic. Hold the mixture at about 175° F. for about 2.5 hours, allowing the phenol and formaldehyde to partially condense, i.e., to react together to a limited extent. Then mix the so-obtained reaction mass with sufficient hydrochloric acid to lower the pH value to between about 4 and 6. This usually requires about 12.8 gallons of about 32 percent by weight, or the equivalent, of aqueous hydrochloric acid solution. As the acid is added, the mixture separates into two phases which are allowed to stratify. The upper layer, which constitutes about 38 percent of the total volume, is largely salt water and, after allowing the reaction mass to cool to room temperature, is discarded. The lower layer comprises a slightly acid, partially condensed, aqueous phenol-formaldehyde liquid resin. It has a viscosity of between about 150 and 400 centipoises (cps.), a pH value of between 4.8 and 5.2 and a density of about 10 pounds per gallon. This liquid is stable for long periods of time but is capable of hardening when suitably catalyzed. To this liquid resin is added 820 pounds of resorcinol and 315 gallons of ethyl alcohol with mixing until dissolved.

Resin B is prepared as a soluble partial condensation product by mixing together 1085 pounds of cresylic acid, 904 pounds of paraformaldehyde, and 32 pounds of 50 percent aqueous sodium hydroxide. The mixture is heated to a temperature of 125° F. and maintained at this temperature until the mixture becomes clear. This clarification takes place usually in about 30 minues. To the product so-obtained is added 4.1 gallons of about 32 percent hydrochloric acid solution. The addition of the acid brings about the formation of two liquid phases which are allowed to stratify into two layers. The upper layer is largely water and is discarded. After discarding the upper layer, the remaining lower layer is heated to about 175° F. for from about 1 to 1.5 hours, so as to bring the viscosity as measured at 80° F., to about 200 cps. The resulting liquid plastic has a pH value of between about 3.7 and 4.3 and a density of about 9.5 pounds per gallon. The amount obtained is about 205 gallons. To this liquid resin is added 309 gallons of ethyl alcohol with mixing.

A thermosettable resin formulation was prepared from the foregoing Resins A and B by adding varying amounts of 25 percent by weight aqueous sodium hydroxide as a catalyst to 1 part by volume of Resin A. After sufficient mixing to obtain a uniform dispersion of the catalyst, 1 part by volume of Resin B was added to the aliquot of Resin A with further mixing. An amino phenol coupling agent was then incorporated with additional mixing.

The phenol-aldehyde resin system thus constituted was employed to consolidate a loose sand according to the following procedure. A pipe mold was packed with a clean, water-wet, graded sand having a size within the range from about 70 to 200 mesh. The mold was appropriately equipped with an inlet and outlet to allow for flushing liquids through material contained within the mold.

A preflush operation was simulated by passing 4 pore volumes of kerosene through the sand. This treatment was followed by 1 pore volume of the catalyzed resin system. The resin was followed by an afterflush consisting of 2 pore volumes of kerosene under a pressure of approximately 25 p.s.i.g. The inlet and outlet valves were then turned off and the mold placed in a constant temperature bath. After 24 hours at a given temperature chosen to simulate a reservoir condition, the consolidated sand core was removed from the mold and its compressive strength was determined according to a standard procedure.

The results of the foregoing test operations, including further comparative testing of resin systems without the coupling agents of the instant invention, are set forth in the following table.

TABLE

| Ex. | Coupling agent | Amount used (percent)[1] | Cure temp. (° F.) | Number of cores tested | Average compressive strength (p.s.i.) |
|---|---|---|---|---|---|
| 1 | None | | 110 | 12 | 203 |
| 2 | DMP | 2 | 110 | 5 | 238 |
| 3 | DMP-quaternized | 3 | 110 | 4 | 238 |
| 4 | DMP-HCl salt | 2 | 110 | 4 | 274 |
| 5 | None | | 150 | 17 | 165 |
| 6 | DMP | 2 | 150 | 4 | 296 |
| 7 | DMP-quaternized | 3 | 150 | 50 | 263 |
| 8 | DMP-HCl salt | 2 | 150 | 17 | 291 |
| 9 | None | | 200 | 7 | 110 |
| 10 | DMP | 2 | 200 | 17 | 360 |
| 11 | DMP-quaternized | 3 | 200 | 7 | 225 |
| 12 | DMP-HCl salt | 2 | 200 | 3 | 316 |
| 13 | None | | 150 | 17 | 165 |
| 14 | TMP-Formic acid salt | 2 | 150 | 4 | 259 |
| 15 | TMP | 2 | 160 | 3 | 230 |
| 16 | DMP-HCl salt+ DMP | 1 0.72 | 150 | 40 | 575 |
| 17 | DBP-HCl salt | 2 | 200 | 4 | 215 |
| 18 | DBP-HCl salt+ DBP | 2 1 | 200 | 4 | 257 |

[1] Percent by volume of liquid resin mixture.

In a manner similar to the above examples, other amino alkyl derivatives such as ortho and para-dimethylaminomethyl resorcinol, ortho - dimethylaminomethyl cresol, 2-dimethylaminomethyl 4-t.-butyl-5-bromo phenol, dimethylaminomethyl - B - napthol, 2,2 - dimethylaminomethyl-4,4'-dihydroxy phenyl propane, 2-dimethylaminoethyl-4-phenyl phenol, and dibutylaminomethyl phenol can be used in either free base form, as soluble salts, or combinations thereof in place of the amino phenols above to achieve improved sand consolidation. The aforementioned amines also can be quaternized, either by reaction with methyl chloride, ethyl chloride or other nucleophilic halogenated compounds to produce similarly useful quaternary coupling agents.

In the above test, addition of the free base form of DMP or TMP to the resin system usually produced a precipitate. Although these modified resins produced consolidated sands of improved strengths, they have undesirable working properties because of the precipitate. For this reason, it is preferred to employ the free base forms of the amino phenols in either a preflush or afterflush of the soil to be consolidated. The amine salt derivatives, on the other hand, have been found to produce storage-stable modified resin systems.

EXAMPLE

A well in St. Mary Parish, Louisiana, having perforations in the casing at a depth of 5690–5695 feet, was treated to consolidate loose or incompetent sands. The 2⅜ inch tubing in the well had a capacity of barrels. A retrievable packer was set in the well, the tubing was filled to capacity with lease crude oil, and five barrels of the crude oil was injected into the formation to determine the injectivity of the formation. As a preflush, 12 barrels of diesel oil was injected, followed by 12 barrels of a mixture comprising 9.6 barrels of diesel oil with 2.4 barrels of isopropyl alcohol, which was then followed by 12 more barrels of diesel oil.

A mixture comprising 200 gallons of Resin A, 200 gallons of Resin B, 4 gallons of the hydrochloride salt of dimethylaminomethyl phenol (DMP–HCl salt), and 2.9 gallons of dimethylaminomethyl phenol (DMP) was prepared at the well site by mixing the individual components together in a conventional paddle mixer. Twenty pounds of a diverting agent, which is more fully described in U.S. 3,134,436, was added to the above resin mixture to insure more even distribution of the resin formulation after it was injected into the formation. Following injection of the resin and diverting agent mixture, an overflush of 19 barrels of diesel oil was displaced from the tubing with lease crude oil, and the well was then shut in. Throughout the entire treatment the injection pressure was maintained below the pressure which would have resulted in hydraulic fracturing of the formation. Thus, the injection rate of the various fluids varied from about 0.45 barrel per minute up to about 0.93 barrel per minute, depending upon which fluid was being injected.

The well was put back on production at a later date, and the produced fluids were found to be free from sand. The lease operator reported that there was very little drawdown in formation pressure, which indicated that the plastic impregnated formation was still highly permeable to the fluids which were desired to be produced. The treatment was therefore deemed to be highly efficacious.

What is claimed is:
1. In a method for consolidating a loose soil which comprises introducing into the soil a hardenable resin system of a phenol and an aldehyde, which can be condensed to form a soluble age-hardenable resin, and a catalyst to promote the hardening of the resin whereby the loose particles in said soil are cohered, the improvement which comprises incorporating into the resin system an amino phenol coupling agent in the form of a soluble tertiaryaminoalkyl phenol, an acid salt of such an amino phenol, a quaternary derivative of such an amino phenol, or combinations thereof.

2. A method as in claim 1 wherein the amino phenol is a dialkylamino methyl derivative of a monocyclic phenol.

3. A method as in claim 1 wherein the amino phenol employed is in the form of an acid salt soluble in a hardenable, partial condensation product of the phenol and aldehyde.

4. A method as in claim 1 wherein the amino phenol is incorporated into the resin system in situ within the soil either as a preflush just preceding emplacement of the resin forming ingredients or as an overflush immediately subsequent their emplacement.

5. A method as in claim 1, wherein the resin system is a partially condensed reaction product of a monocyclic phenol and formaldehyde, and the amino phenol is a dimethylaminomethyl phenol, which is premixed with the partial condensation product prior to its emplacement within the soil mass treated, as a soluble amine salt.

6. A method as in claim 1, wherein the coupling agent incorporated into the resin system is a combination of an amino phenol with an acid salt of such an amino phenol, or a quaternary derivative thereof.

7. A method as in claim 1, wherein the coupling agent incorporated into the resin system is a combination of a dialkylamino methyl derivative of a monocyclic phenol with an acid salt thereof.

References Cited

UNITED STATES PATENTS

| | | | |
|---|---|---|---|
| 2,045,517 | 6/1936 | Bruson et al. | 260—566 |
| 2,476,015 | 7/1949 | Wrightsman | 166—33 |
| 3,022,825 | 2/1962 | Winsauer et al. | 166—33 |
| 3,221,814 | 12/1965 | Hower | 166—33 |
| 3,282,338 | 11/1966 | Walther et al. | 166—33 |
| 3,285,339 | 11/1966 | Walther et al. | 166—33 |
| 3,297,086 | 1/1967 | Spain | 166—33 |
| 3,343,600 | 9/1967 | Phansalkar et al. | 166—33 |
| 3,384,174 | 5/1968 | Smith | 166—33 |
| 3,391,738 | 7/1968 | Sparlin | 166—33 |

STEPHEN J. NOVOSAD, *Primary Examiner.*

U.S. Cl. X.R.

166—33